July 22, 1969  M. W. LINN  3,456,852

MEASURING ARRANGEMENT

Filed April 10, 1967

INVENTOR
MAYNARD W. LINN
BY
Don Finkelstein
ATTORNEY

United States Patent Office

3,456,852
Patented July 22, 1969

3,456,852
MEASURING ARRANGEMENT
Maynard W. Linn, 3605 Stephen White Drive,
San Pedro, Calif. 90731
Filed Apr. 10, 1967, Ser. No. 629,802
Int. Cl. B65d 25/46; G01f 11/24
U.S. Cl. 222—284                8 Claims

ABSTRACT OF THE DISCLOSURE

There is disclosed herein an improved measuring arrangement for dispensing powdered or granulated products from containers. The dispensing spout is hingedly connected to the container and moves into and out of the container through an aperture in the wall thereof. The sides of the spout are resiliently deformable with respect to the spout front, and frictionally engage the sides of the aperture so that the sides of the aperture squeeze the sides of the spout together when the spout is rotatingly moved from a first or loading position within the container to a second or dispensing position outside the container. The back of the spout is composed of an expandable, flexible material so that movement of the side walls is permitted. A divider means is positioned within the spout and is comprised of a plurality of planar means extending from the base of the spout to regions adjacent the top, and between the walls, to divide the volume contained between the side walls, the front wall and the flexible, expandable rear wall of the spout into a plurality of individual chambers having predetermined volumes. Accurate measurement within each of the volumes is obtained by the side squeezing action of the flexible resilient sides and a scooping action of the peak of the rear wall together with a scraping action by the top edge of the aperture in the container to insure repeatable and accurate measurement of the contents of each of the volumes in the dispensing spout.

BACKGROUND OF THE INVENTION

Field of the invention

This invention relates to the measuring art and more particularly to an improved dispensing spout for dispensing granulated or powdered materials from a container in predetermined, measured amounts.

Description of the prior art

In many applications, it is desirable to dispense powdered or granulated material from a container. Such applications include, of course, dispensing of salt, soap, sugar, or the like. It will be appreciated that mentioning of specific commodities to be dispensed or specific applications of applicant's improved measuring spout arrangement are not limitations upon the structure or applicability of applicant's invention.

In such applications it is often also desirable to dispense predetermined quantities repetitively from the container. That is, for example, it may be desired to dispense a quarter or half, or three-quarters, or a whole teaspoon of salt from a salt container and such measurements should not only be accurate but should be repetitively accurate.

That is each time that it is desired to dispense a predetermined amount of the contents of the container, it is desired that the exact same amount be dispensed substantially each and every time.

To the best of applicant's knowledge, prior art dispensing spouts have not been able to achieve these desiderata. In certain prior art dispensing spouts there has not been provided any means for insuring that the product in the spout was loaded to any type of uniform density and thus could vary from dispensing operation to dispensing operation as to the exact quantity contained therein.

Further, such spouts have generally not been able to provide accurately calibrated plural measurements in a single spout, that is there have not been generally provided means in a single spout for dispensing accurately less than a full spout measure.

SUMMARY OF THE INVENTION

Accordingly, it is the object of applicant's invention herein to provide an improved measuring spout arrangement.

It is another object of applicant's invention herein to provide a measuring spout arrangement in which accurate measurement of predetermined amounts of the contents of the container may be repetitively dispensed.

It is yet another object of applicant's invention herein to provide a measuring spout arrangement in which a plurality of predetermined volumes for dispensing different amounts accurately and repetitively are provided in a single dispensing spout.

The above and other objects are achieved, according to one embodiment of applicant's invention, by providing in a measuring spout arrangement a dispensing spout that is hingedly coupled to the wall of the container. The container is provided with a generally quadrilateral aperture, therethrough to provide communications with the interior of the container and the contents therein. The dispensing spout is adapted to rotatingly move on the container wall from a first or loading position within the container to a second or dispensing position exterior of the container.

The dispensing spout is generally comprised of a substantially rigid front wall, at the bottom of which is the hinged coupling to the container wall, and a pair of resiliently deformable side walls that frictionally engage the side edges of the aperture in the container. The side walls are resiliently, divergently coupled to the rigid front wall of the spout and as the spout is rotated outwardly to the dispensing position, the frictional engagement of the side walls with the edges of the aperture of the container squeezes the side walls together a predetermined amount to insure a positive tamping action on the contents of the container that is contained within the dispensing spout.

The rear wall of the dispensing spout is comprised of an expandable, flexible material so that the rear wall allows the divergent positioning of the side walls when the spout is contained within the container.

To prevent the spout from rotating completely within the container and to provide a seal-like means around the aperture into the container it is preferred that the rigid front wall of the spout be provided with edge margins around the sides and top thereof to engage margins of the container wall adacent the edges of the aperture.

The top edge of the aperture is adapted to pass in scraping relationship to the arcuate top edges of the side walls and thereby provide not only a scraping action for even measurement of the contents of the spout but also a tamping action to insure a substantially uniform density of the contents of the container that may be contained within the spout.

The rear wall is also provided with a peak-like means, in the preferred embodiment of applicant's invention, that extends above the side walls to provide a scooping action for the contents of the container and also aids in retention of the contents in the spout until the tamping action forces an overflow. This insures that there is at least an overflow of the contents within the soput to be scraped by the top edge of the aperture in the wall of the container during the rotation of the spout from the position within the container, which may be considered the loading position, to the position exterior the container, which is the dispensing position.

In another embodiment of applicant's invention, the spout is provided with a divider means that divides the spout into a plurality of predetermined volumes. The divider means may comprise a plurality of planar means extending from regions adjacent to the hinged coupling of the front wall to the container to regions adjacent the arcuate top of the side walls and the planar means is substantially coplanar along the top edges thereof with the arcuate top edges of the side walls. A spacer means may be utilized as desired to hold the planar means in proper spaced apart relationship to insure the desired volumetric capacities for the individual chambers.

The above and other embodiments of applicant's invention may be more thoroughly understood from the following detailed description taken together with the accompanying drawings.

DESCRIPTION OF THE PREFERRED EMBODIMENTS

Figure 1:
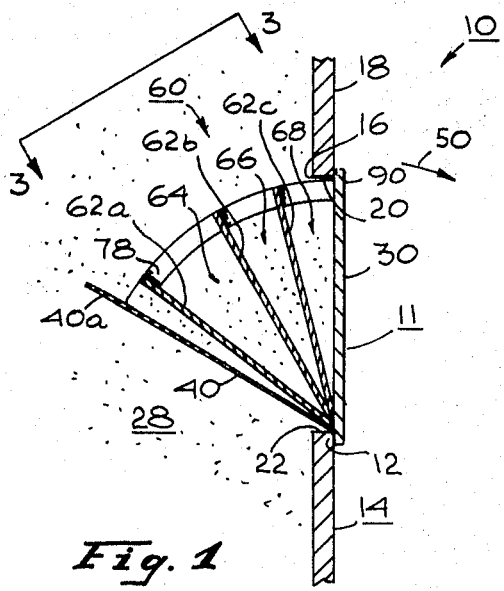
FIGURE 1 is a sectional view of one embodiment of applicant's invention in the loading position.

Referring now to the drawing, there is shown a structure comprising a preferred embodiment of applicant's improved measuring spout arrangement, generally designated 10. A dispensing spout means 11 is hingedly connected at 12 to a container 14 adajacent a generally quadrilateral aperture 16 in the wall 18 thereof. The quadrilateral aperture 16 is generally bounded by an upper edge 20, a lower edge 22, and side edges 24 and 26. The contents 28 of the container 14 are of the granulated or powdered type for dispensing from the improved dispensing spout means 11.

The dispensing spout means 11 is comprised of a substantially rigid front wall means 30, a pair of resiliently deformable side wall means 32 and 34, which may preferably be resiliently coupled at 36 and 38, respectively, to the front wall 30 and a flexible, expandable back wall 40, coupled to the side walls 32 and 34 to define a cavity 42 having a predetermined volume therebetween.

Each of the resiliently deformable side wall means 32 and 34 are coupled to the front wall 30 along front edges thereof, at 36 and 38, respectively, from regions adjacent to the hinged coupling 12 of the measuring spout 11 to the container 14, to regions adjacent the top portion 44 thereof.

It will be appreciated that if the side walls 32 and 34 are comparatively stiff, lateral movement thereof may be accomplished by resilient bending at the coupling to the front wall and flexing or bending of the rear wall, without any or even appreciable resilient deformation thereof.

Figure 2:
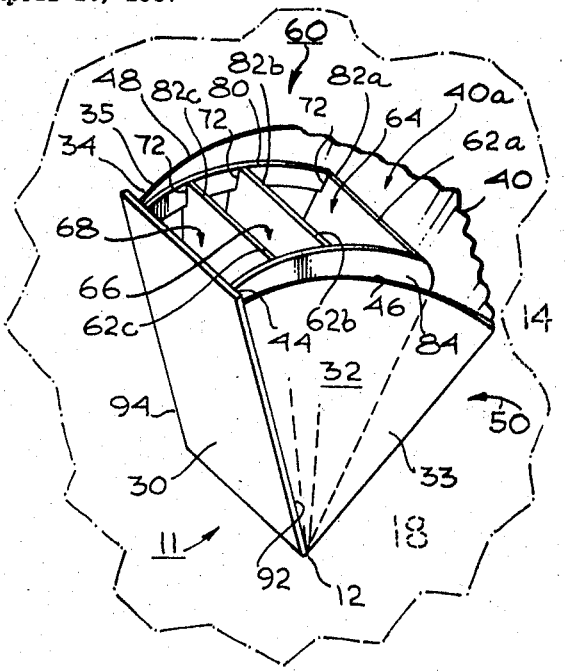
FIGURE 2 is a perspective view of an embodiment of applicant's invention.

The rear wall 40 is coupled to each of the side walls 32 and 34 from regions adjacent the hinged coupling 12 to the arcuate top edges 46 and 48 of the side walls 32 and 34, respectively, so that the side walls 32 and 34 define sectors of a circle. The arcuate top edges 46 and 48 are on a generally circular arc struck about the hinged coupling 12, so that the dispensing spout 11 is rotatably mounted within the container 14 in a first or loading position as illustrated in FIGURE 1 and is adapted to rotate outwardly therefrom in the direction indicated by the arrow 50 to the second dispensing position illustrated in FIGURE 2.

The resiliently deformable side walls 32 and 34 and the rigid front wall may be fabricated from materials suitable for the purpose. For example, they may be fabricated from cardboard, thin sheet plastic or light gauge metal. It is desirable, of course, that in many applications of applicant's invention, the dispensing spout 11 should be fabricated of comparatively inexpensive materials since it is generally discarded with the used container 14 when the contents thereof have been fully utilized.

The flexible, expandable back wall 40 may be fabricated from, for example, paper, thin flexible sheet plastic or the like that may be folded into a corrugated or accordion fold, having one or more folds therein, positioned for allowing the resilient movement of the side walls 32 and 34.

Figure 3:
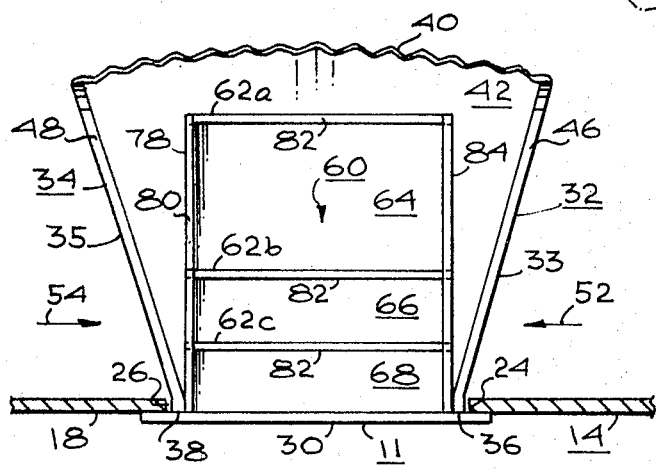
FIGURE 3 is a sectional view along the line 3—3 of FIGURE 1.
Figure 4:
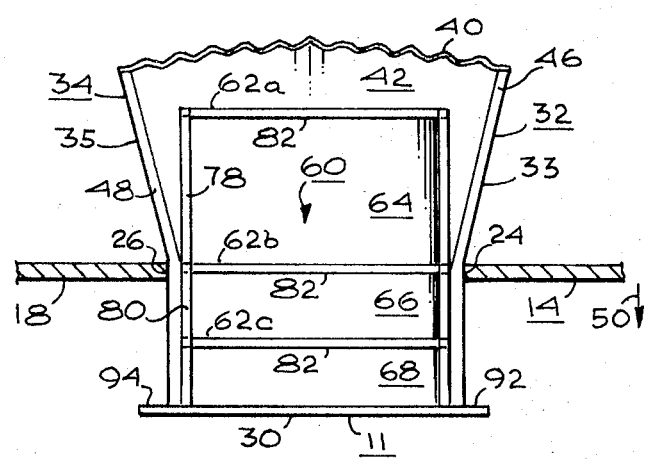
FIGURE 4 is a sectional view of applicant's invention in a partially opened or dispensing position.

As can best be seen from FIGURES 3 and 4, the side edges 24 and 26 of the aperture 16 in the wall 18 of the container 14 are adapted to frictionally engage the external surfaces 33 and 35 of side walls 32 and 34, respectively, of the dispensing spout 11. Further, as can be seen from FIGURE 3, in the closed or loading position as illustrated in FIGURE 3, the sidewalls 32 and 34 are divergently coupled to the front wall 30. That is, the side walls 32 and 34 diverge away from each other to define a constantly increasing distance between them from the front wall 30 to the rear wall 40 in the closed or loading position.

When the dispensing spout 11 is rotated outwardly from the container 14 in the direction indicated by the arrow 50, the side edges 24 and 26 of the generally quadilateral aperture 16 in the wall 18 of the container 14 exert forces on the side walls 32 and 34 in the direction indicated by the arrows 52 and 54, due to the frictional engagement therebetween. The forces 52 and 54 and rigidity of the wall 18 of the container 14 compared with the resiliently deformable nature of the side walls 32 and 34, allow the side walls 32 and 34 to be moved toward each other, in the direction indicated by the arrows 52 and 54, so that they are forced into generally parallel relationship defining a predetermined distance therebetween as they pass through the aperture 16. This compresses and tamps the contents 28 of the container 14, the showing of which is omitted from FIGURES 3 and 4 for clarity, to a predetermined density or packing in the cavity 42, so that uniform loading thereof is accomplished each time that the dispensing spout 11 is utilized.

To aid further in the tamping or compressing or consolidating action, applicant prefers that the upper edge 20 of the aperture 16 pass in close scraping relationship to the top edges 46 and 48 of the side walls 32 and 34 so that an even amount is scraped off each time to insure accurate repetitive measurements.

In the preferred embodiment of applicant's invention, applicant prefers that the flexible expandable rear wall 40 be provided with a peak portion 40a thereof that extends above the arcuate top edges 46 and 48 of the side walls 32 and 34 so that the peak portion 40a acts as a scoop to scoop additional contents 28 of the container 14 over the cavity 42 during the rotation in the direction indicated by arrow 50 to be scraped off by the upper edge 20 of the generally quadrilateral aperture 16 and thus insure that each time the entire cavity 42 is filled.

The preferred embodiment of applicant's measuring spout arrangement 10 is also provided with means for allowing dispensing repetitively and accurately of amounts less than a full volume of the cavity 42. Such divider means, generally designed 60 may be comprised of a plurality of generally planar members 62a, 62b and 62c. These planar members extend a pre-selected distance between the side walls 32 and 34 from regions adjacent the hinged coupling 12 to regions adjacent the arcuate top edges 46 and 48. In the second or dispensing position, the divider means 60 divides the cavity 42 into a plurality of chambers 64, 66, and 68, which, for convenience, may measure respectively, ½, ¼, and ¼ of a predetermined unit loading for the dispensing spout 11. That is, for example, if the contents of the container 14 is salt, it may be desired that the chamber 64 provide a measurement of a half teaspoon, the chamber 66 provide the measurement of a quarter teaspoon and the chamber 68 provide a measurement of a quarter of a teaspoon.

In order to maintain the planar means 62a, 62b and 62c in the proper spaced apart relationship, applicant prefers to provide a spacer means 70 coupled to shoulder portions 72 on each of the planar means 62a, 62b and 62c in regions adjacent the top portions thereof. The spacer means 78 also has an arcuate top edge 80 that is aligned with and coplanar with the arcuate top edges 46 and 48 of the side walls 32 and 34 so that both the top edges 46 and 48 of the side walls 32 and 34, a top edge 80 of the spacer means 78 and the top edges 82a, 82b and 82c of the planar means 62a, 62b and 62c respectively all pass in scraping relationship to the top edge 20 of the generally quadrilateral aperture 16 in the container 14.

The planar means 62a, 62b, and 62c may be frictionally retained in the volume 60 or may be bonded or otherwise secured to the front wall 30, for example, along the region adjacent the hinged coupling 12.

As the spout 11 is extended from the container 14, the side walls 32 and 34 are urged inwardly towards each other to engage successively the side edges of the planar means 62a, 62b and 62c, thus forming the chambers 64, 66 and 68.

If desired, a second spacer means 84 may be provided that is identical to the divider means 80 except it is set on the opposite side of the planar means 62a, 62b and 62c to help maintain the proper spaced apart relationship thereof.

The rigid front wall 30 of the dispensing spout 11 is also provided with a top edge margin 90 that extends above the top edge 20 of the quadrilateral aperture 16 and overlies a portion of the wall 18 of the container 14 adjacent the top edge 20. Similarly, the rigid front wall 30 of the dispensing spout 11 is also provided with side edge margins 92 and 94 that overlie the side edges 24 and 26 of the quadrilateral aperture 16 to close the quadrilateral aperture 16 and prevent the passage of foreign material therein when the dispensing spout 11 is in the first or loading position.

When it is desired to dispense a predetermined measure of the contents 28 of the container 14, spout 11 may start from the first or loading position, as shown in FIGURE 1 and be rotated outwardly therefrom, relative to the container 14, in the direction indicated by the arrow 50. For example, if it is desired to dispense ½ of a teaspoon of salt, utilizing in this example the above described measurements for the chambers 64, 66 and 68, the spout 11 is rotated until the top wall 82b of the planar means 62b is aligned with the top edge 20 of the wall 18 of the container 14. This position is shown in FIGURE 4. The contents of the chambers 66 and 68 may then be dumped therefrom for utilization as desired. The close scraping relationship proximity of the top edge 20 of the quadrilateral aperture 16 to the top edge 82 of the planar means 62b assures that only the contents of the chamber 66 and 68 are thus dispensed. It will be appreciated that the volume of the chambers 64, 66 and 68 relative to each other and absolute in size may be varied depending upon the particular commodity comprising the contents 28 that is to be dispensed.

If it is desired to provide a continuous pour of the contents 28, the spout 11 may be rotated outwardly until the upper wall 20 is aligned over the space provided between the divider means 62a and the flexible expandable back wall 40, so that there is direct communication with regions external the container 14 to allow the continuous pouring of the contents 28.

From the above it can be seen that applicant has described an improved measuring spout arrangement for the dispensing of granulated or powdered products. Applicant's improved measuring spout accurately and repetitively allows dispensing of predetermined volumes of the contents of the container which have been tamped or compressed to a predetermined density so that accurate measurement thereof is repetitively made.

Those skilled in the art may find many variations and adaptations of applicant's improved measuring spout arrangement. Therefore, the following claims are intended to cover all such variations and adaptations falling within the true scope and spirit thereof.

I claim:

1. A measuring spout arrangement for dispensing the contents of a container, the container being of the type in which there is provided a substantially quadrilateral spout accepting aperture in the wall of the container, to permit the removal of the contents thereof, comprising in combination:

a dispensing spout comprising:
a rigid front wall, hingedly coupled to the container adjacent a lower edge of the quadrilateral aperture therein for rotational movement relative thereto;
a pair of resiliently deformable side walls having external surfaces, rear edges and arcuate top edges, said pair of side walls resiliently coupled in spaced apart relationship to said front wall, and said external surfaces of said pair of side walls frictionally engaging side edges of the aperture, and said pair of side walls angularly divergent from each other for the condition of the spout in a first or loading position within the container, and said frictional engagement with said side edges of said aperture for urging said pair of side walls toward each other for the condition of said spout rotating about said hinged coupling;
and a flexible, expandable back wall coupled to said rear edges of said side walls to define a cavity with a predetermined volume therebetween.

2. The arrangement defined in claim 1 wherein:
the top edge of the aperture passes in close scraping relationship to said arcuate top edges of said side walls.

3. The arrangement defined in claim 2, wherein:
said back wall has a peak portion extending above said arcuate top edge of said side walls for scooping the contents of the container into said cavity;
and said front wall has top and side edge margin portions adapted to overlie wall regions of the container adjacent the quadrilateral aperture.

4. The arrangement defined in claim 3 and further comprising:
divider means extending a predetermined distance between said pair of side walls and having upper edge portions coplanar therewith for dividing said cavity into a plurality of chambers having predetermined volumes.

5. The arrangement defined in claim 4 wherein said divider means further comprises:
at least one spacer means coupled to edge portions of said divider means for maintaining said divider means in a pre-selected spaced apart array, and said spacer means having an upper arcuate edge substantially coplanar with said arcuate top edge of said side walls.

6. The arrangement defined in claim 5 wherein:
said side walls have a front edge coupled to said front wall and extending from regions adjacent said hinged coupling to said arcuate top edge in regions adjacent said top edge margin of said front wall, and a rear edge coupled to said flexible expandable rear wall and said rear edge extending from regions adjacent said hinged coupling of said front wall to said arcuate top edge of said side wall.

7. The arrangement defined in claim 6 wherein:
said divider means further comprises a plurality of planar means extending from said hinged coupling of said front wall of said spout to the container and are intermediate said front wall and said flexible, expandable rear wall;

and each of said plurality of planar means spaced a pre-selected distance from said front wall.

8. The arrangement defined in claim 7 and wherein: each of said plurality of planar means has a cut-out shoulder portion adjacent the top edge thereof for accepting said spacer means and said spacer means rigidly coupled on said shoulder to each of said plurality of planar means to maintain said planar means in said predetermined spaced apart array.

References Cited

UNITED STATES PATENTS 1,411,000  3/1922  Condon _____ 222—305

ROBERT B. REEVES, Primary Examiner

N. L. STACK, Jr., Assistant Examiner

U.S. Cl. X.R.

222—438, 566